(12) United States Patent
Matsunaga

(10) Patent No.: US 8,619,335 B2
(45) Date of Patent: Dec. 31, 2013

(54) IMAGE PROCESSING APPARATUS, METHOD OF CONTROLLING THE SAME, AND STORAGE MEDIUM STORING PROGRAM

(75) Inventor: Daisuke Matsunaga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 13/121,000

(22) PCT Filed: Dec. 13, 2010

(86) PCT No.: PCT/JP2010/072823
§ 371 (c)(1),
(2), (4) Date: Mar. 25, 2011

(87) PCT Pub. No.: WO2011/083675
PCT Pub. Date: Jul. 14, 2011

(65) Prior Publication Data
US 2011/0267654 A1      Nov. 3, 2011

(30) Foreign Application Priority Data

Jan. 6, 2010  (JP) .................................. 2010-001570

(51) Int. Cl.
*H04N 1/40*       (2006.01)
*G06K 15/22*      (2006.01)
*G03G 15/20*      (2006.01)

(52) U.S. Cl.
USPC ............................ 358/3.24; 358/1.4; 399/341

(58) Field of Classification Search
USPC ............ 358/1.9, 539, 1.5, 2.1, 1.15, 1.4, 518, 358/522, 3.24; 399/341, 321, 49; 347/9
See application file for complete search history.

(56) References Cited

U.S. PATENT DOCUMENTS

2007/0230778 A1    10/2007  Matulic
2009/0303504 A1*   12/2009  Iinuma et al. .................. 358/1.9

FOREIGN PATENT DOCUMENTS

| JP | 2003-283822 A | 10/2003 |
| JP | 2007-034040 A | 2/2007 |
| JP | 2007-288769 A | 11/2007 |
| JP | 2008-145784 A | 6/2008 |
| JP | 2009-181045 A | 8/2009 |
| JP | 2009-288775 A | 12/2009 |
| JP | 2010-152129 A | 7/2010 |

OTHER PUBLICATIONS

Japanese Office Action issued on Jun. 10, 2013 in corresponding application No. 2010-001570.

* cited by examiner

*Primary Examiner* — Charlotte M Baker
(74) *Attorney, Agent, or Firm* — Carter, DeLuca, Farrell & Schmidt LLP

(57) ABSTRACT

Read image data is segmented into a plurality of regions in accordance with the attribute of the image data. A region to be printed using a transparent toner is set in accordance with the attributes of the plurality of segmented regions. A preview of the image represented by the image data is displayed, in which the region set to be printed using the transparent toner is distinguished from the remaining regions. An instruction to change the region to be printed using the transparent toner is accepted based on the displayed preview. Print data for the transparent toner to print, using the transparent toner, a region determined based on the change instruction to be printed using the transparent toner is generated.

7 Claims, 11 Drawing Sheets

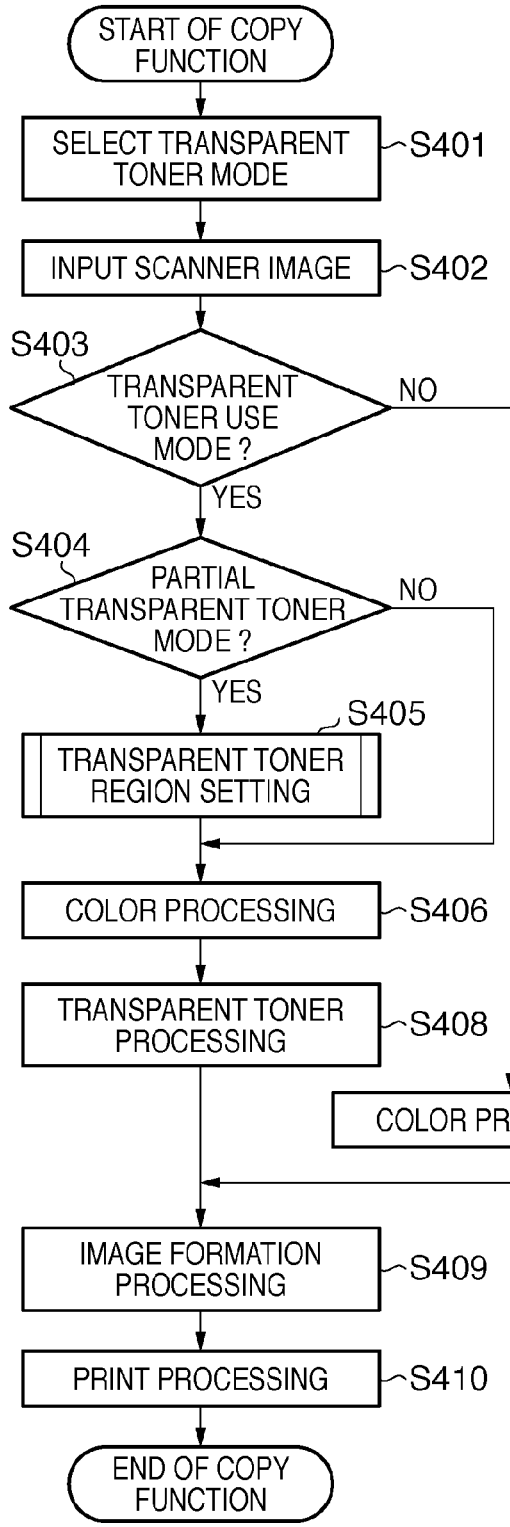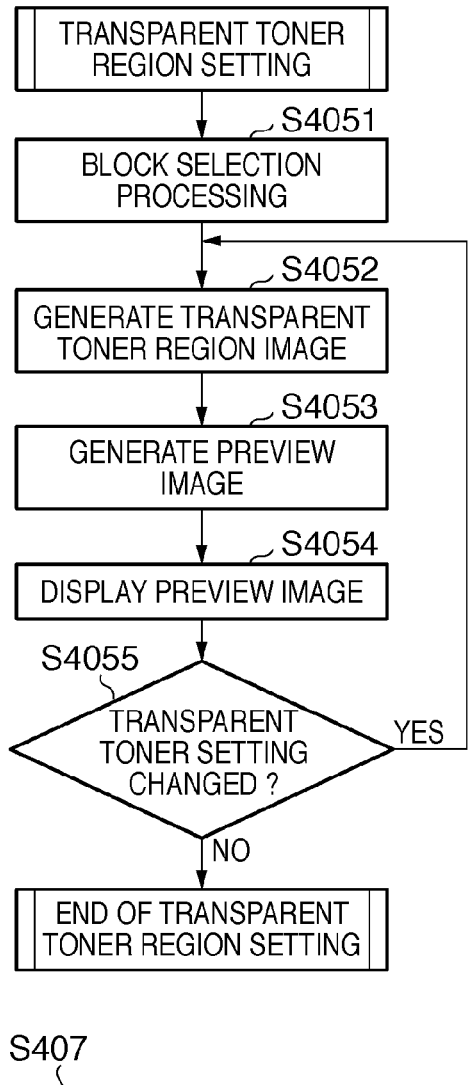
FIG. 4A
FIG. 4B

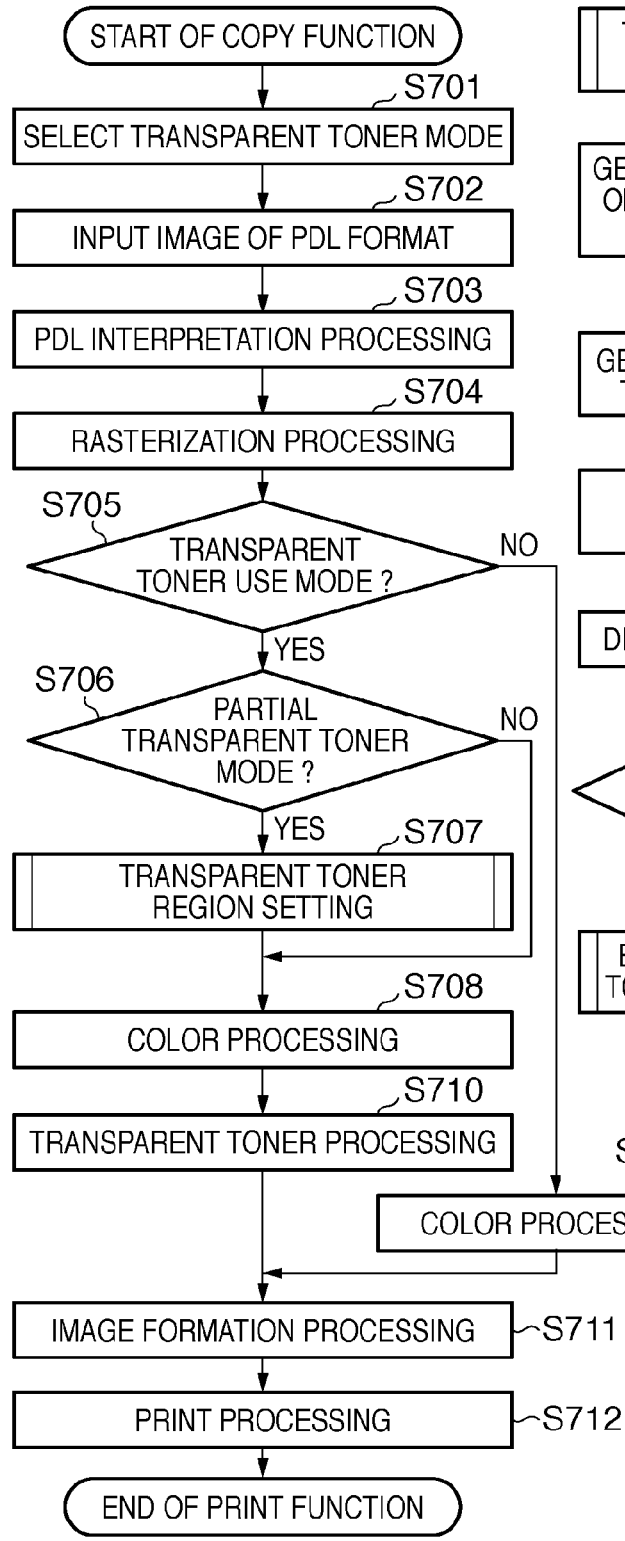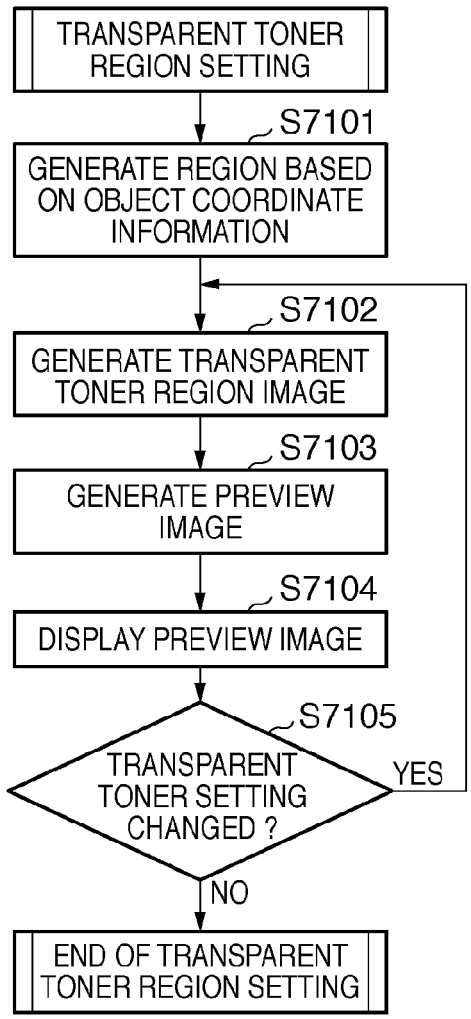

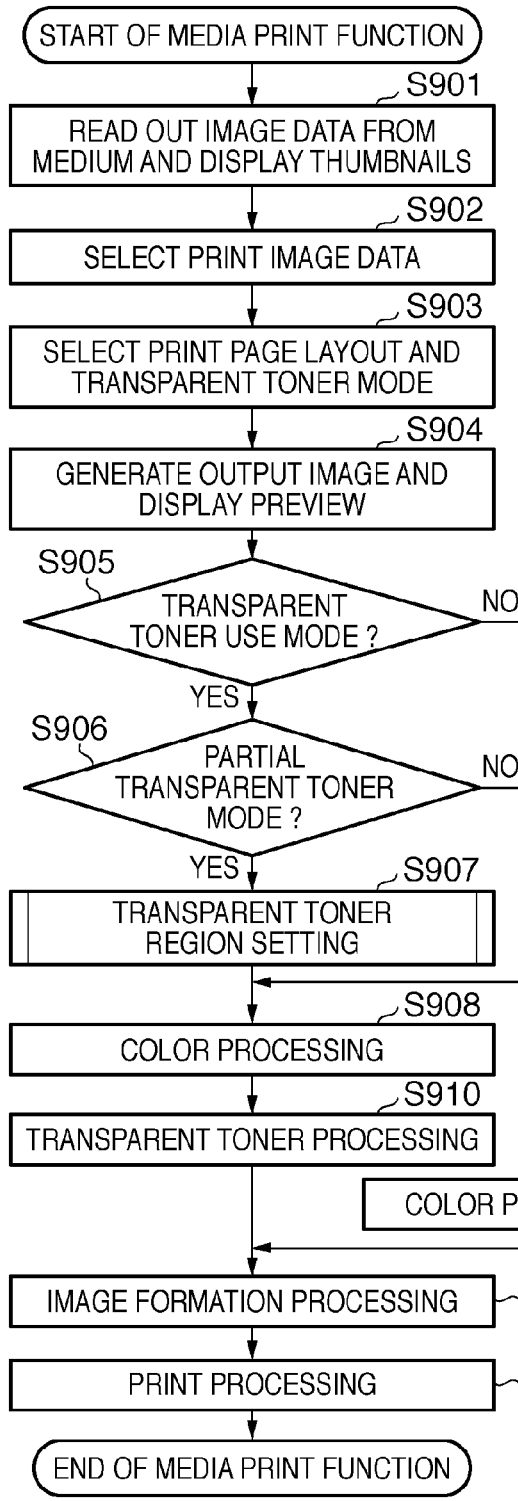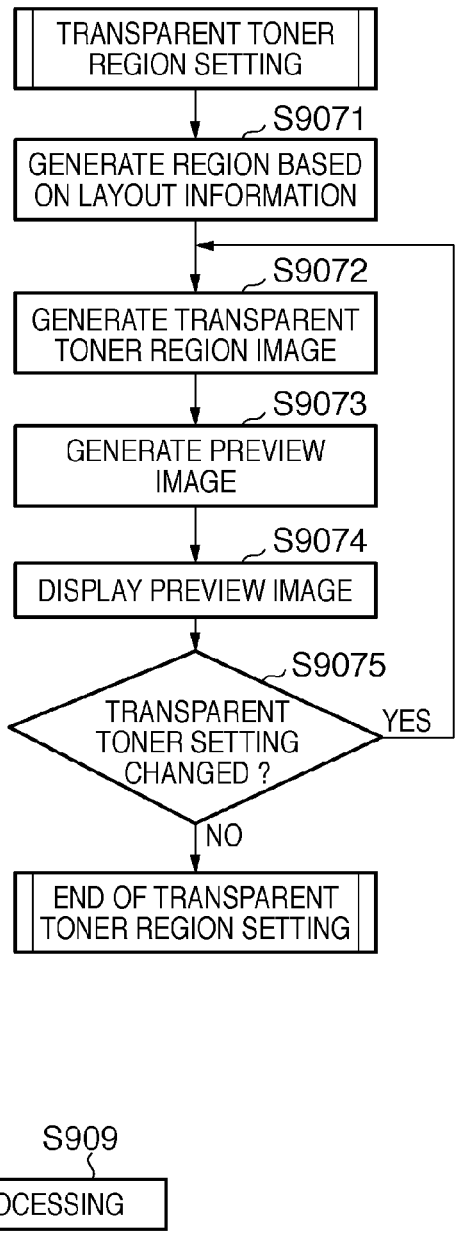
FIG. 9A
FIG. 9B

F I G. 11
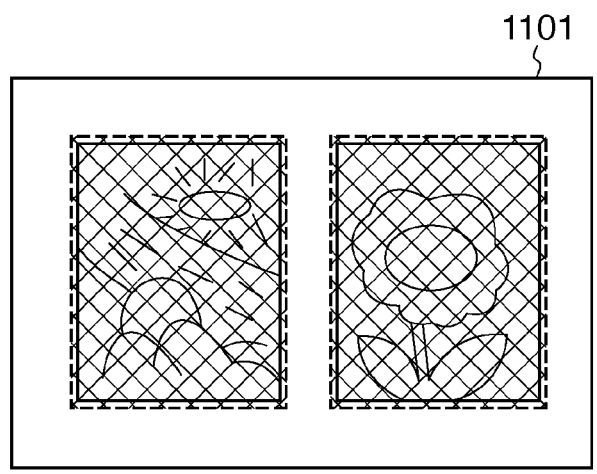
F I G. 12
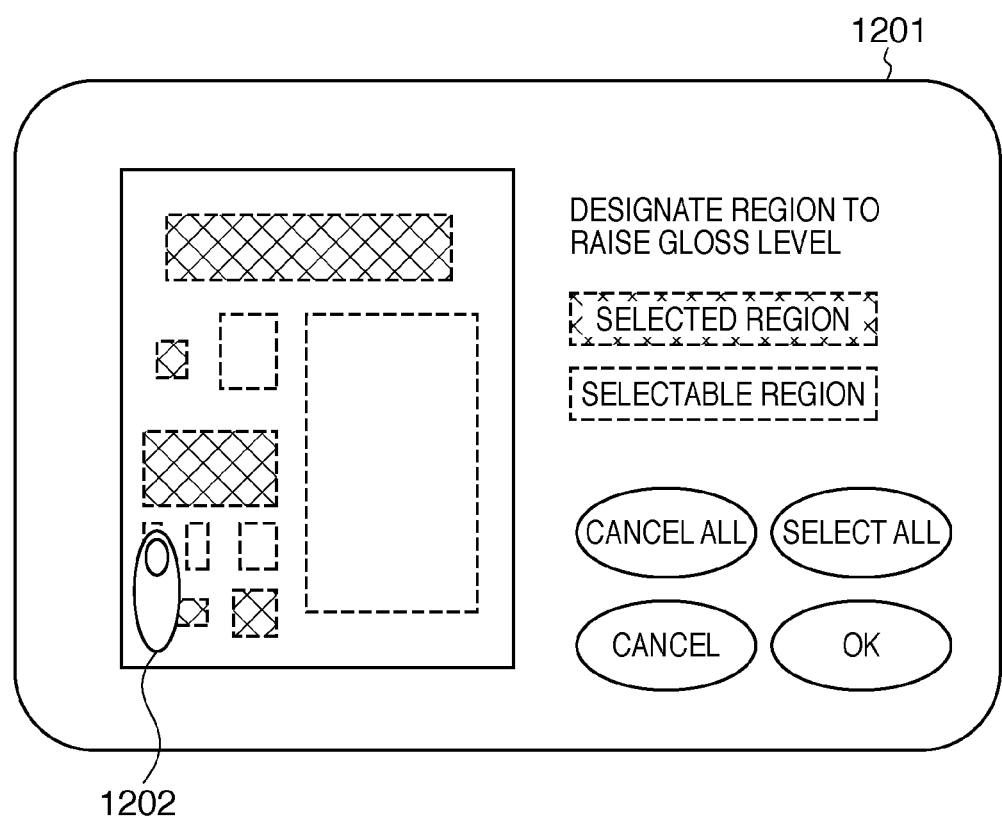

IMAGE PROCESSING APPARATUS, METHOD OF CONTROLLING THE SAME, AND STORAGE MEDIUM STORING PROGRAM

CROSS REFERENCE TO RELATED APPLICATIONS

This application is a National Stage filing of PCT Application No. PCT/JP2010/072823 filed on Dec. 13, 2010, which claims priority from Japanese Patent Application No. 2010-001570 filed on Jan. 6, 2010, the disclosures of each of which are hereby incorporated by reference herein in their entirety.

TECHNICAL FIELD

The present invention relates to an image processing apparatus for printing an image using a transparent toner, a method of controlling the same, and a storage medium storing a program.

BACKGROUND ART

A recent image processing apparatus performs not only full-color printing by electrophotography using four CMYBk toners but also multi-color printing using special toners.

Examples of the special toners are a transparent toner capable of absorbing unevenness of the surface of a printed product to implement a high gloss and a light toner capable of suppressing graininess of a highlight portion. Using such special toners allows to obtain new added value different from normal digital printing. Against this backdrop, an image processing apparatus such as an MFP containing special toners is used.

A technique related to the transparent toner is described in Japanese Patent Laid-Open No. 2007-034040, which distinguishes a non-text photo region of a printed image and automatically applies the transparent toner to the distinguished non-text photo region. Japanese Patent Laid-Open No. 2008-145784 describes a technique of previewing the range of image data transferred from a host computer, where the transparent toner is to be applied.

In these prior arts, however, when printing an image with the transparent toner partially applied, the user cannot easily change the range to apply the transparent toner.

For example, Japanese Patent Laid-Open N 2007-034040 makes no special mention of user's changing and designating a range, though it describes automatically applying the transparent toner to a non-text photo region.

Japanese Patent Laid-Open No. 2008-145784 makes no special mention of user's changing and designating a range, though it describes displaying the range to apply the transparent toner. Range changing can supposedly be implemented by, for example, regenerating the image of the transparent toner application region on the host computer. However, it is not convenient in an environment in which the host computer does not exist near the image processing apparatus.

Especially when printing an image with the transparent toner partially applied in, for example, a convenience store where many and unspecified users use the image processing apparatus, every user needs to be able to easily change the range to apply the transparent toner.

SUMMARY OF INVENTION

An aspect of the present invention is to eliminate the above-mentioned problems with the conventional technology. The present invention provides an image processing apparatus that easily changes a region to be printed using a transparent toner, a method of controlling the same, and a storage medium storing a program.

The present invention in its first aspect provides an image processing apparatus including a reading unit configured to read image data; a segmentation unit configured to segment the image data read by the reading unit into a plurality of regions in accordance with an attribute of the image data; a setting unit configured to set a region to be printed using a transparent toner in accordance with attributes of the plurality of regions segmented by the segmentation unit; a display unit configured to display a preview of an image represented by the image data in which the region set by the setting unit to be printed using the transparent toner is distinguished from remaining regions; an accepting unit configured to accept an instruction to change the region to be printed using the transparent toner based on the preview displayed by the display unit; and a control unit configured to control to print, using the transparent toner, a region determined based on the change instruction accepted by the accepting unit to be printed using the transparent toner.

The present invention in its second aspect provides a method of controlling an image processing apparatus, which is executed in the image processing apparatus for processing image data for printing, the method including a reading step of reading image data; a segmentation step of segmenting the image data read in the reading step into a plurality of regions in accordance with an attribute of the image data; a setting step of setting a region to be printed using a transparent toner in accordance with attributes of the plurality of regions segmented in the segmentation step; a display step of displaying a preview of an image represented by the image data in which the region set in the setting step to be printed using the transparent toner is distinguished from remaining regions; an accepting step of accepting an instruction to change the region to be printed using the transparent toner based on the preview displayed in the display step; and a generation step of generating print data for the transparent toner to print, using the transparent toner, a region determined based on the change instruction accepted in the accepting step to be printed using the transparent toner.

The present invention in its third aspect provides a computer-readable storage medium storing a program which causes a computer to function to: read image data; segment the read image data into a plurality of regions in accordance with an attribute of the image data; set a region to be printed using a transparent toner in accordance with attributes of the plurality of segmented regions; display a preview of an image represented by the image data in which the region set to be printed using the transparent toner is distinguished from remaining regions; accept an instruction to change the region to be printed using the transparent toner based on the displayed preview; and control to print, using the transparent toner, a region determined based on the change instruction to be printed using the transparent toner.

According to the present invention, it is possible to easily change a region to be printed using a transparent toner.

Further features of the present invention will become apparent from the following description of exemplary embodiments with reference to the attached drawings.

BRIEF DESCRIPTION OF DRAWINGS

FIGS. 4A and 4B are flowcharts illustrating the procedure of processing of setting a transparent toner region in the copy function;

FIGS. 7A and 7B are flowcharts illustrating the procedure of processing of setting a transparent toner region in the print function;

FIGS. 9A and 9B are flowcharts illustrating the procedure of processing of setting a transparent toner region in the media print function;

FIG. 11 is a view for explaining preview image data generation in the media print function; and FIG. 12 is a view showing a screen when many small display regions are included.

DESCRIPTION OF EMBODIMENTS

Figure 1:
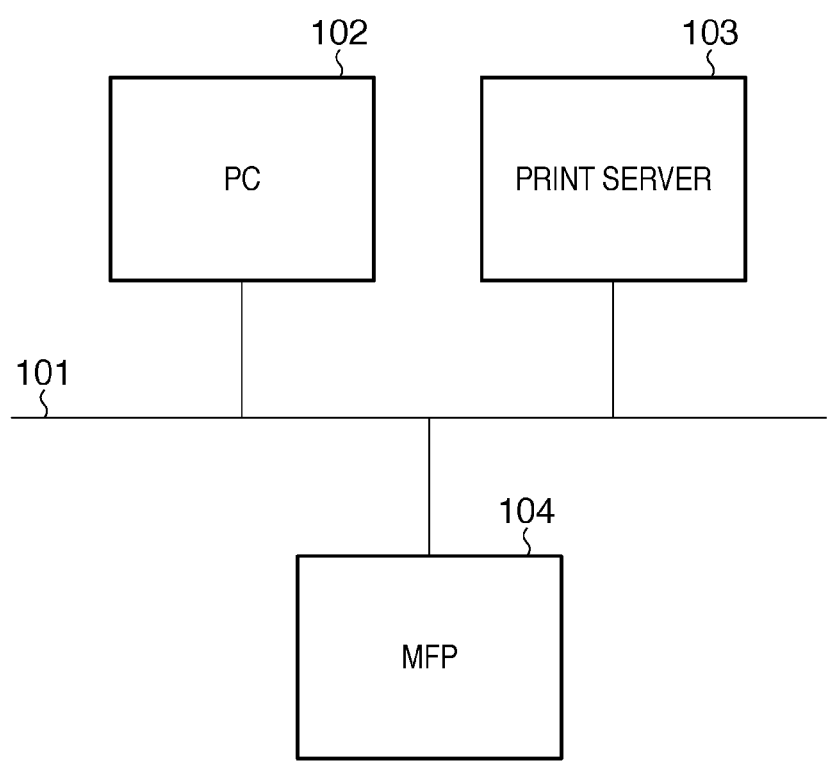
FIG. 1 is a block diagram showing the arrangement of a system including an image processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same constituent elements, and a repetitive description thereof will be omitted.

(First Embodiment)

FIG. 1 is a block diagram showing the arrangement of a system including an image processing apparatus according to the embodiment of the present invention. A PC 102, print server 103, and image processing apparatus (to be referred to as an MFP hereinafter) 104 are connected to a network 101. When the MFP 104 performs a print operation, the PC 102 transfers print image data of PDL (Page Description Language) format to the print server 103 or the MFP 104. The print server 103 spools the print image of PDL format received from the PC 102 and sequentially transfers it to the MFP 104. In the print system, the print image of PDL format spooled from the PC 102 to the print server 103 is transferred to the MFP 104 in accordance with an instruction from the MFP 104 so as to start print processing. The MFP 104 is a multi function peripheral having a print function, media print function, copy function, Send function, and the like.

The print function can interpret print image data of PDL format received from the PC or the print server, convert it into a raster image, and cause the printer to print it. The media print function can rasterize image data stored in an external storage device such as an SD card or a USB memory connected to the MFP and cause the printer to print it. The copy function can process an image read by the image scanner and cause the printer to print it. A Send function can convert image data read by the image scanner into a Tiff or PDF image file and transfer it to the PC, a file server, or the like.

(MFP)

Figure 2:
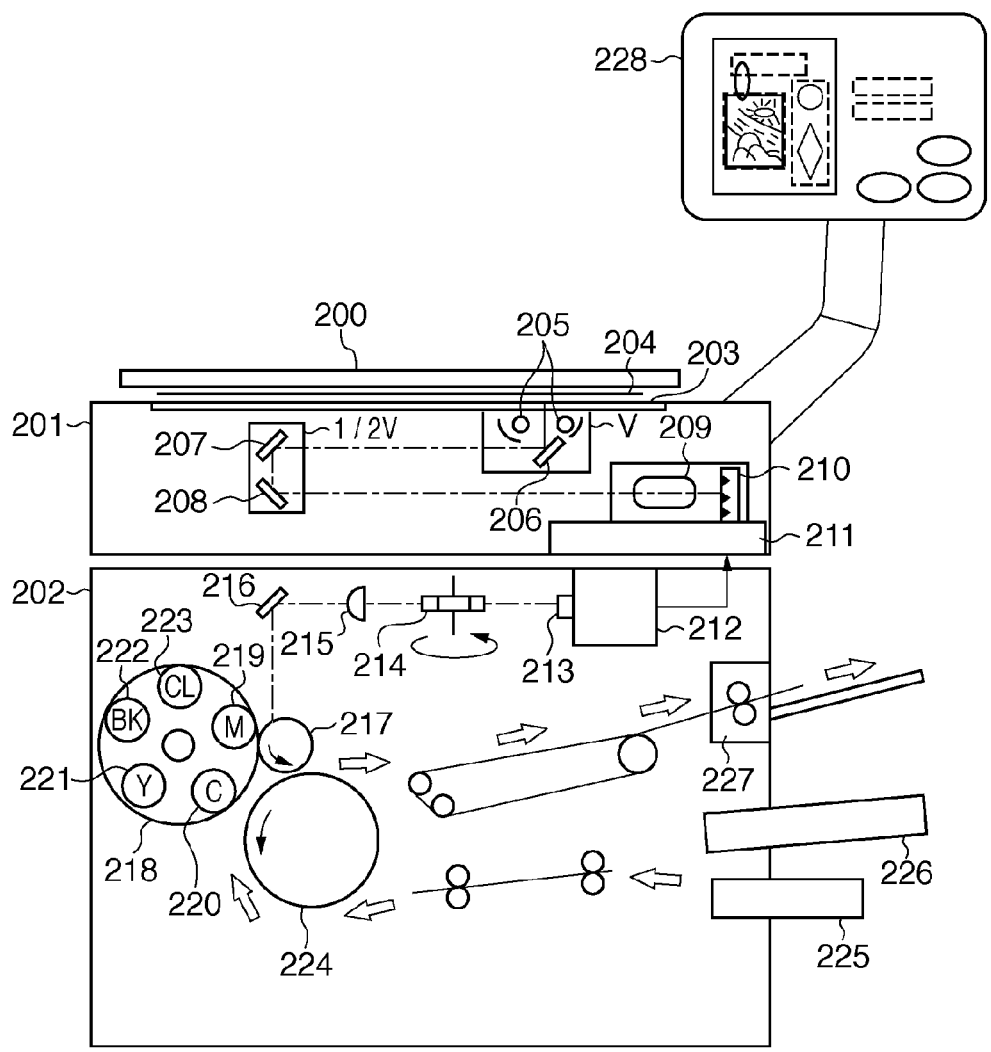
FIG. 2 is a view showing the internal arrangement of the image processing apparatus.

FIG. 2 is a view showing the internal arrangement of the MFP 104. Referring to FIG. 2, an image scanner (image reading unit) 201 reads a document image, and performs digital signal processing of the read image data. A printer 202 prints the image data read by the image scanner 201 on a printing medium (paper sheet or the like) in, for example, full color.

The image scanner 201 includes a mirror press plate 200. A lamp 205 irradiates a document 204 on a platen glass (to be referred to as a platen hereinafter) 203, and mirrors 206, 207, and 208 guide the reflected light. The reflected light forms an image on a three-line solid-state image sensor (to be referred to as a CCD hereinafter) 210 via a lens 209. Three image signals of red (R), green (G), and blue (B) are sent to a data processing unit 211 as full-color information. Note that the lamp 205 and the mirror 206 move at a velocity v, and the mirrors 207 and 208 move at a velocity v/2 mechanically in a direction perpendicular to the electrical scanning (main scanning) direction of the line sensor. This allows to scan (sub-scan) the whole surface of the document. The document 204 is read at a resolution of 600 dpi (dots/inch) in the main scanning and sub-scanning directions. The read image signal is stored in a data storage unit (not shown) inside the data processing unit 211 for each document page.

The data processing unit 211 electrically processes the image signal stored in it for each pixel, separates the signal into magenta (M), cyan (C), yellow (Y), and black (Bk) components, and sends them to the printer 202. The data processing unit 211 also internally generates an image signal CL of transparent component for each pixel and outputs it to the printer 202. The output M, C, Y, and Bk image signals are sent to a laser driver 212. The laser driver 212 modulates and drives a semiconductor laser 213 in accordance with the received image signals. The laser beam scans the surface of a photosensitive drum 217 via a polygon mirror 214, f/θ lens 215, and mirror 216. Like reading, the write is performed at a resolution of 600 dpi (dots/inch) in the main scanning and sub-scanning directions.

A rotary developer 218 includes a magenta developing unit 219, cyan developing unit 220, yellow developing unit 221, black developing unit 222, and clear (transparent) developing unit 223. The five developing units 219 to 223 alternately come into contact with the photosensitive drum 217 so as to develop the electrostatic latent image formed on the photosensitive drum 217 by toners of respective colors. A transfer drum 224 winds a paper sheet supplied from a paper cassette 225 or 226 on it and transfers the image developed on the photosensitive drum to the paper sheet.

After the five color toners, that is, the CMYBk and clear (transparent) toners are thus sequentially transferred, the paper sheet passes through a fixing unit 227 to fix the toners and is then discharged. The paper sheet may be discharged after it has undergone the above-described process again to reprint. A UI operation unit 228 is formed from a touch panel so as to do transparent toner mode setting or preview display to be described later.

(Data Processing Unit)

Figure 3A:
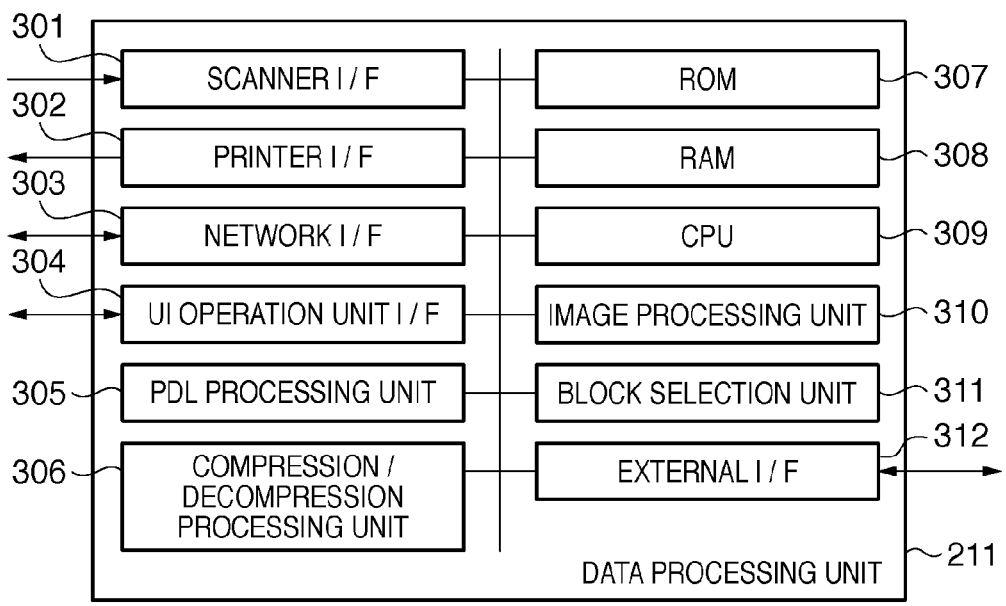
FIGS. 3A and 3B are block diagrams showing the arrangement of a data processing unit shown in FIG. 2.

FIG. 3A is a block diagram showing the arrangement of the data processing unit 211 of the MFP 104. A scanner I/F 301 is an interface configured to input image data read by the image scanner 201. A printer I/F 302 is an interface configured to transfer image data processed by the data processing unit 211 to the printer 202. A network I/F 303 is an interface configured to receive print image data of PDL format transferred from the PC 102 or the print server 103 or transfer image data of a Tiff or PDF file created by the data processing unit 211 to the PC 102. A UI operation unit I/F 304 is an interface configured to communicate with the UI operation unit 228. A PDL processing unit 305 interprets print image data of PDL format received from the PC 102 or the print server 103 and generates raster image data. A compression/decompression processing unit 306 JPEG-compresses/decompresses the raster image data.

A ROM 307 stores control programs to be executed in the data processing unit 211. A CPU 309 reads out the programs from the ROM 307 and executes them. A RAM 308 stores received print image data of PDL format and raster image data. An image processing unit 310 performs various kinds of image processing necessary for the print function, copy function, and send function. The image processing unit performs not only rotation, scaling, thinning, and Tiff/PDF file generation but also transparent toner processing, composite processing, and the like. A block selection unit 311 performs block selection (or block segmentation) processing of raster image data to separate the image data into a plurality of types of regions such as a photo region and a text region. An external I/F 312 is an interface configured to transfer an image file and the like from an external storage device such as an SD card or a USB memory.

(Image Processing Unit)

Figure 3B:
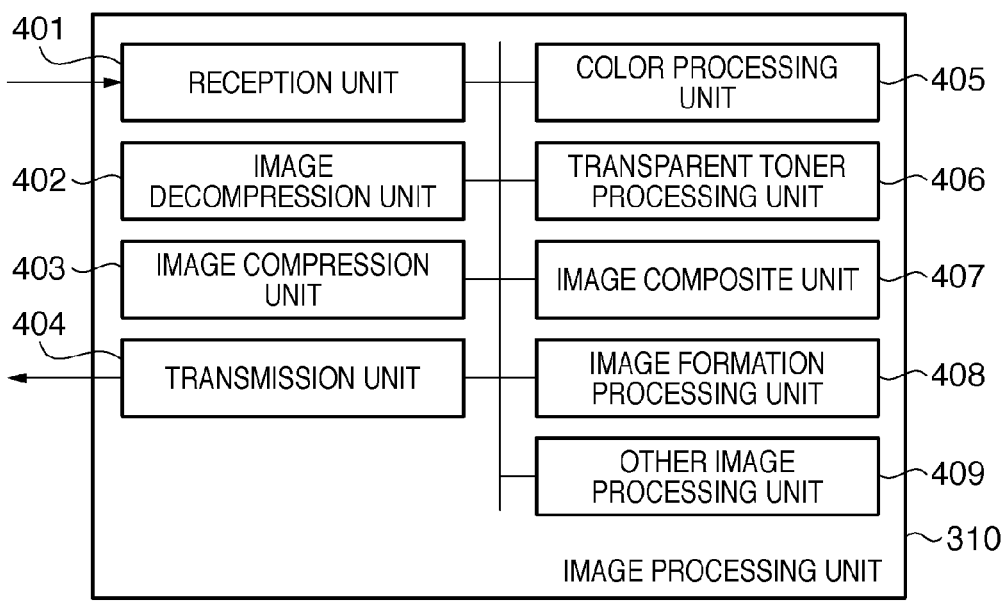

FIG. 3B is a block diagram showing the arrangement of the image processing unit 310. A reception unit 401 receives raster image data from outside. If the reception unit 401 has received compressed raster image data, an image decompression unit 402 decompresses the data. A transmission unit 404 transmits raster image data to outside. When transmitting raster image data from the transmission unit 404, an image compression unit 403 compresses the data as needed. A color processing unit 405 converts raster image data expressed by RGB luminance into raster image data expressed by CMYBk density. A transparent toner processing unit 406 determines the amount of toner to be applied to a region as a transparent toner application target. When displaying a preview screen for transparent toner region selection to be described later, an image composite unit 407 composites print image data with image region information obtained by the block selection unit 311. The composite image is transferred to the UI operation unit 228 via the UI operation unit I/F 304 and previewed. An image formation processing unit 408 performs various kinds of image processing such as gamma processing, screen processing, and error diffusion processing which are executed before transferring print image data to the printer 202. Another image processing unit 409 performs image processing such as rotation, scaling, and thinning used in the print function, copy function, and Send function.

(Transparent Toner Output Processing in Copy Mode)

FIG. 4A is a flowchart illustrating the procedure of normal print processing to be performed by the MFP 104 when executing the copy function. The processing shown in FIG. 4A is performed by, for example, causing the CPU 309 to read out a program stored in the ROM 307 to the RAM 308 and execute it.

When the copy function starts, the MFP accepts user's transparent toner mode selection via the UI operation unit 228. The MFP accepts selection of a transparent toner use mode or a transparent toner non-use mode. When the transparent toner use mode is selected, the MFP further accepts selection of a partial transparent toner mode to partially apply the transparent toner or a full transparent toner mode to apply the transparent toner to the whole print image (S401).

When mode selection is done in step S401, the image scanner 201 starts reading the document, and the RAM 308 stores RGB raster image data via the scanner I/F 301 (S402). The CPU determines which mode is selected by the user in step S401: the transparent toner use mode or transparent toner non-use mode (S403). Upon determining that the transparent toner use mode is selected, the CPU further determines which mode is selected, the partial transparent toner mode or full transparent toner mode (S404). If it is the partial transparent toner mode, the process advances to transparent toner region setting processing (S405).

FIG. 4B is a flowchart illustrating the procedure of transparent toner region setting processing in step S405. In this processing, first, the block selection unit 311 performs block selection processing of the stored raster image data (S4051). When image data 500 shown in FIG. 5 undergoes block selection processing using a conventionally known block selection technique, for example, image data 501 including image region information (attributes) is obtained. An image region 502 is a text region, an image region 503 is a photo region, an image region 504 is a line image region, and an image region 505 is a background region. The text region, photo region, line image region, and background region are examples of attributes.

Figure 5:
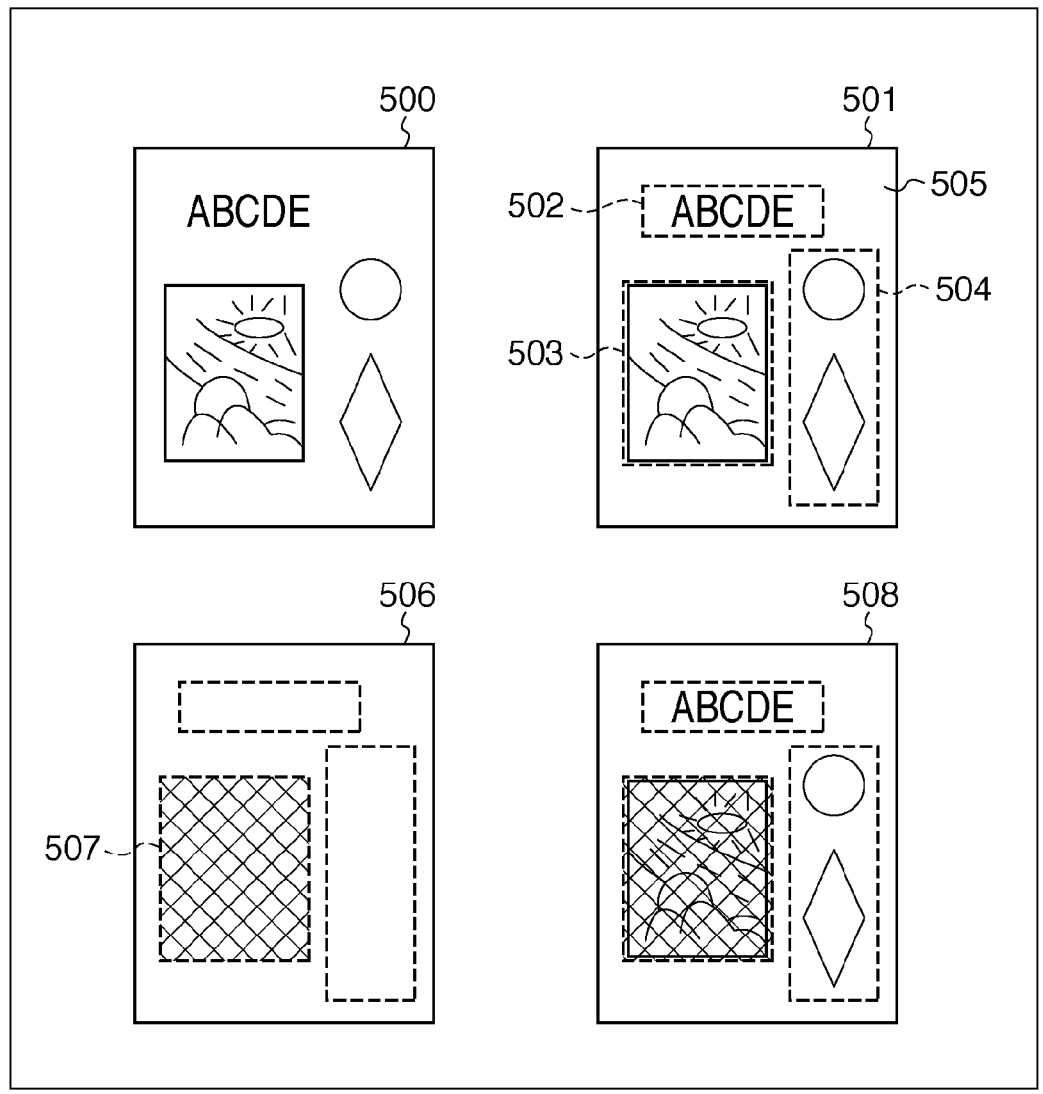
FIG. 5 is a view for explaining preview image data generation in the copy function.

After step S4051, transparent toner region image data 506 as shown in FIG. 5, which represents a region to apply the transparent toner, is generated based on the obtained image region information (S4052). The transparent toner region image data includes dotted rectangles representing regions other than the background region. In this embodiment, the image region to apply the transparent toner is assumed to be the photo region. Applying the transparent toner to a photo region is set upon initialization. For this reason, an image region 507 corresponding to the photo region is crosshatched to indicate that the region is set as the target of transparent toner application. Any expression other than crosshatching is usable if the user can distinctly recognize that the region is set as the transparent toner application target. For example, an animation may be used to express the glossy region. This also applies to the dotted lines representing image regions other than the background region.

Figure 6:
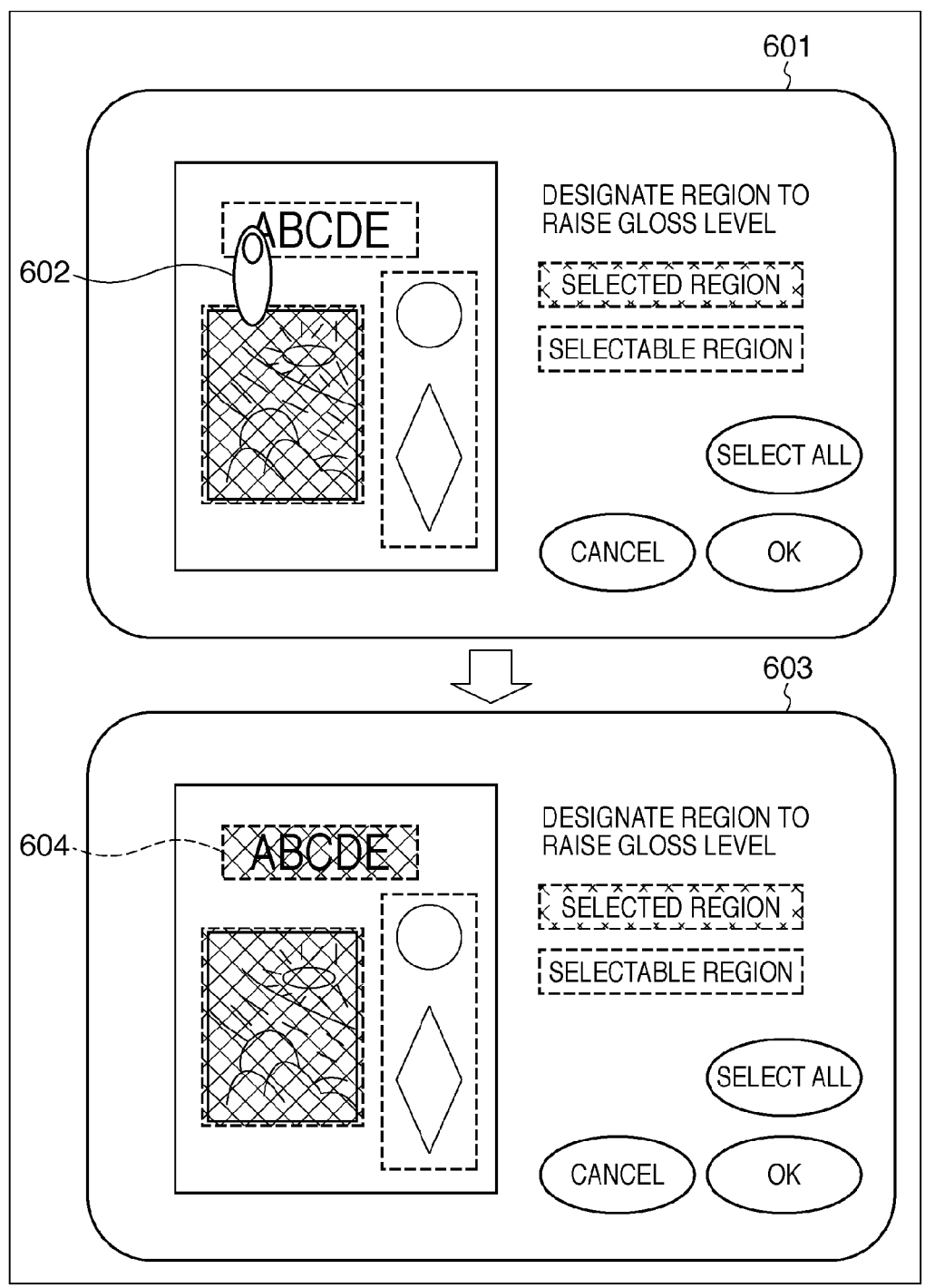
FIG. 6 is a view showing a screen for setting a transparent toner region in the copy function.

When the transparent toner region image data 506 is generated, the image composite unit 407 of the image processing unit 310 composites the transparent toner region image data 506 with the input image data 500 to generate preview image data 508 (S4053). The created preview image data 508 is displayed on the UI operation unit 228 like a UI screen 601 in FIG. 6 via the UI operation unit I/F 304 (S4054).

The UI screen 601 explicitly displays the region to apply the transparent toner in addition to the preview of the image itself. The MFP 104 can also accept, via the UI screen 601, user's selection of a designation of whether or not to apply the transparent toner to each image region acquired in step S4051. When the user designates an image region set to apply the transparent toner, the MFP 104 sets not to apply the transparent toner to the image region. On the other hand, when the user designates an image region set not to apply the transparent toner, the MFP 104 sets to apply the transparent toner to the image region. The user can easily instruct to change the transparent toner setting of an image region, as in an image region 604 on a UI screen 603, only by selecting the image region of the preview image displayed on the UI screen 601 using, for example, an icon 602 in FIG. 6. Note that if "selected region" is designated as a region whose gloss level is to be increased, the MFP sets to apply the transparent toner to the image regions set to apply the transparent toner. If the user presses "selectable region", the MFP 104 controls to apply the transparent toner to all of the plurality of selectable regions. If the user presses "select all", the MFP 104 controls to apply the transparent toner to the image regions and regions other than the image regions.

When the user touches the image region 604 as the transparent toner setting target, that is, changes the transparent toner setting, the process returns to transparent toner region image generation processing in step S4052 (S4055). The transparent toner region image data 506 representing the regions to apply the transparent toner is generated again. Then, the preview image data 508 is generated and displayed as a preview. The series of processes is performed until the user presses the OK or cancel button on the UI screen 601.

When the regions to apply the transparent toner are determined again in the above-described way in the partial transparent toner mode, the process returns to FIG. 4A, and color processing is performed in step S406. In the color processing, the color processing unit 405 converts the luminance-based RGB raster image data read by the image scanner 201 into density-based CMYBk raster image data. Conversion to the CMYBk signals is done by a matrix operation given by $$\begin{pmatrix} C \\ M \\ Y \\ Bk \end{pmatrix} = \begin{pmatrix} A1 & A2 & A3 \\ A4 & A5 & A6 \\ A7 & A8 & A9 \\ A10 & A11 & A12 \end{pmatrix} \begin{pmatrix} R \\ G \\ B \end{pmatrix} \quad (1)$$

In step S408, transparent toner print data to be printed using the transparent toner is generated. The transparent toner processing unit 406 calculates the transparent toner component from the CMYBk signals. First, based on the image region 507 set as the transparent toner region, it is determined for each pixel whether it is a pixel to apply the transparent toner. For a pixel not to apply the transparent toner, the transparent toner amount CL is set to 0. For a pixel to apply the transparent toner, the transparent toner amount CL is calculated by the following method.

In the calculation, first, the total toner amount of CMYBk is obtained. The total toner amount indicates the amount of toners to be transferred to a paper sheet for each pixel based on the total signal amount of the four CMYBk colors. The total toner amount is normally expressed as a percentage to the maximum value of single color that is set as 100%. When an image signal is expressed as an 8-bit integer, the maximum value of single color is 255. Hence, the total toner amount is obtained by multiplying the sum of CMYBk by 100/255.

For example, if the 8-bit image signals are expressed for a pixel by C=80, M=95, Y=140, and Bk=110, the total toner amount is obtained by $$\text{total toner amount} = (C+M+Y+Bk) \times 100/255 = 167\% \quad (2)$$

Normally, the general upper limit value of the total toner amount is about 200% to 280%, and is determined by the image forming process or the like. In this embodiment, the total amount after forming a transparent toner layer needs to be equal to or less than the upper limit value. If the upper limit value of the total toner amount is assumed to be 240%, the difference between the upper limit value and the numerical value of equation (2) can be regarded as a density ratio allowable in the transparent toner layer. The allowable amount is obtained by $$\text{allowable amount} = 240 - 167 = 73\% \quad (3)$$

The transparent toner amount CL of each pixel is determined within the range of the allowable amount. In this embodiment, the transparent toner amount is determined by a method of applying the transparent toner to the maximum value of the allowable amount. However, the gloss level may be optimized by any other method.

When the CMYBk toner amounts and the transparent toner amount CL are determined, the image processing unit 310 causes the image formation processing unit 408 to execute gamma correction processing of each color in step S409. In addition, image formation processes such as screen processing and error diffusion processing are executed for each color. Finally in step S410, the image data is transmitted from the printer I/F 302 to the printer 202, and the MFP 104 prints the image using the CMYBk and CL toners.

The print effect when using the transparent toner will be explained. The print effect (gloss or mat) depend on the difference in surface characteristic between paper and the transparent toner. As for paper, the surface of coated paper and that of non-coated paper are different. The surface of coated paper has little unevenness because of the coating. On the other hand, the surface of non-coated paper is uneven because of the influence of paper fiber.

When normal printing using the transparent toner is performed on paper, its surface still has unevenness to some extent at the portion where the transparent toner is applied even after passing through the fixing unit 227 of the MFP 104. When normal printing using the transparent toner is performed on coated paper, the printed portion (that is, the surface of the transparent toner) obtains a mat effect because the surface of the coated paper is not uneven but the surface of the transparent toner is uneven.

On the other hand, when normal printing using the transparent toner is performed on non-coated paper, both the paper and the transparent toner have unevenness on surface. However, since the surface unevenness of the non-coated paper is generally larger than that of the transparent toner, the printed portion (that is, the surface of the transparent toner) obtains a gloss effect. That is, the method of calculating the transparent toner amount CL in the transparent toner processing in step S408 needs to be changed depending on the type of print paper. In this embodiment, however, a method of printing non-coated paper will be described as an example.

Referring back to FIG. 4A, upon determining in step S404 that the full transparent toner mode is selected, the user need not do transparent toner region setting as described in step S405, and the process skips the transparent toner region setting processing of step S405. Upon determining in step S403 that the transparent toner non-use mode is selected, the process skips all the processes of steps S405 and S408 concerning the transparent toner. That is, after performing the same color processing (S407) as in step S406 and image formation processing (S409) for the input image, the process advances to print processing in step S410 to execute printing. As described above, according to the embodiment, the user can not only easily change the transparent toner region on the UI screen but also omit unnecessary user operations on the UI screen when, for example, the transparent toner mode is not selected.

(Transparent Toner Output Processing in Print Mode)

Transparent toner output processing in the print mode will be described next.

FIGS. 7A and 7B are flowcharts illustrating the procedure of normal print processing to be performed by the MFP 104 when executing the print function. The processing shown in FIGS. 7A and 7B is executed by, for example, the CPU 309. When the print function starts, the user selects the transparent toner mode on the PC 102 by, for example, a printer driver or the like (S701). After that, the PC 102 outputs an image print instruction. Image data of PDL format is transferred to the MFP 104 or the print server 103 (S702). When the PC 102 has an arrangement for generating the transparent toner region image data 506 on the printer driver, the generated transparent toner region image data 506 may be transferred together with the image data of PDL format. In this case, the UI operation unit 228 on the side of the MFP 104 need not do transparent toner setting (S707). In this embodiment, an example will be described in which the printer driver on the PC 102 does not have the arrangement for generating the transparent toner region image data 506, or the transparent toner region needs to be confirmed or changed on the MFP 104 because the PC 102 and the MFP 104 are far part from each other.

The image data of PDL format transferred from the PC 102 or the print server 103 to the MFP 104 undergoes PDL interpretation processing (S703) and rasterization processing (S704) by the PDL processing unit 305 of the MFP 104. The rasterized image data is stored in the memory and used as print image data and preview image data.

Figure 8:
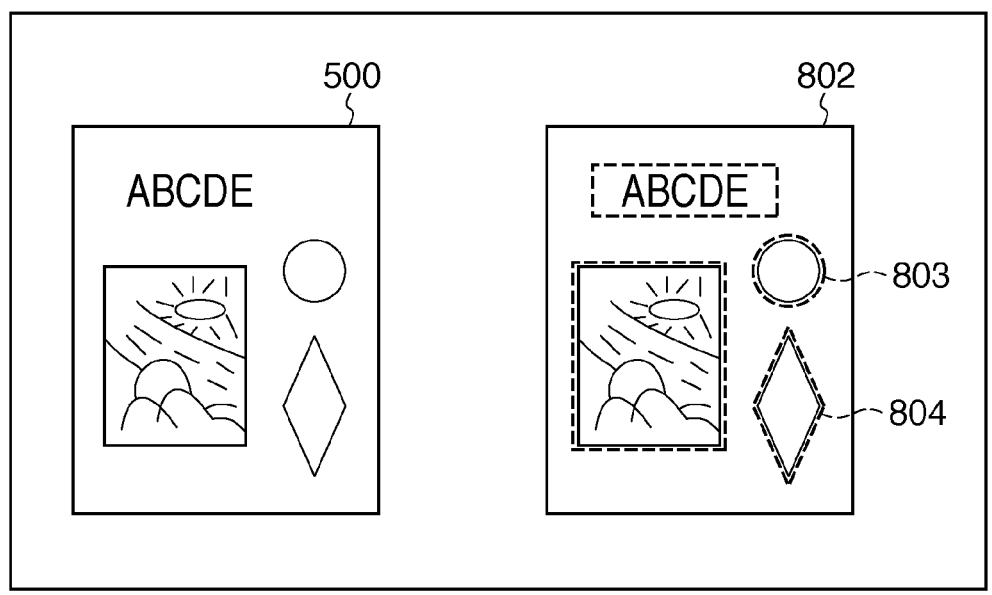
FIG. 8 is a view for explaining preview image data generation in the print function.

Only the difference from the copy function described with reference to FIGS. 4A and 4B will be described below up to print processing (S712). When executing the copy function, a region for transparent toner setting is selected in transparent toner region setting (S405) based on image region information acquired by the block selection unit 311. On the other hand, in the print function, a region for transparent toner setting is selected in transparent toner region setting (S707) based on object information contained in the image data of PDL format. More specifically, in the PDL interpretation processing (S703) of the input image data of PDL format, object regions included in the image data of PDL format are extracted as selectable regions to be displayed on the preview screen of the UI operation unit 228. A transparent toner selection region is generated based on the extracted region information (S7101). At this time, the selectable regions are, for example, regions 803 and 804 surrounded by dotted lines in image data 802 shown in FIG. 8. As can be seen by comparison with region information indicated by the dotted line portions of the image data 501 obtained by the block selection processing, using the object information enables to more finely set transparent toner regions.

In color processing (S708 or S709), CMYBk raster image data may be input in the print function, though RGB raster image data is input when executing the copy function. In this case, the color processing unit 405 adjusts the density by arithmetic processing or the like.

As described above, even when executing the print function, the user can not only easily change the transparent toner region on the UI screen but also omit unnecessary user operations on the UI operation unit 228 when, for example, the transparent toner mode is not selected.

(Transparent Toner Output Processing in Media Print Mode)

Transparent toner output processing in the media print mode will be described next.

Figure 10:
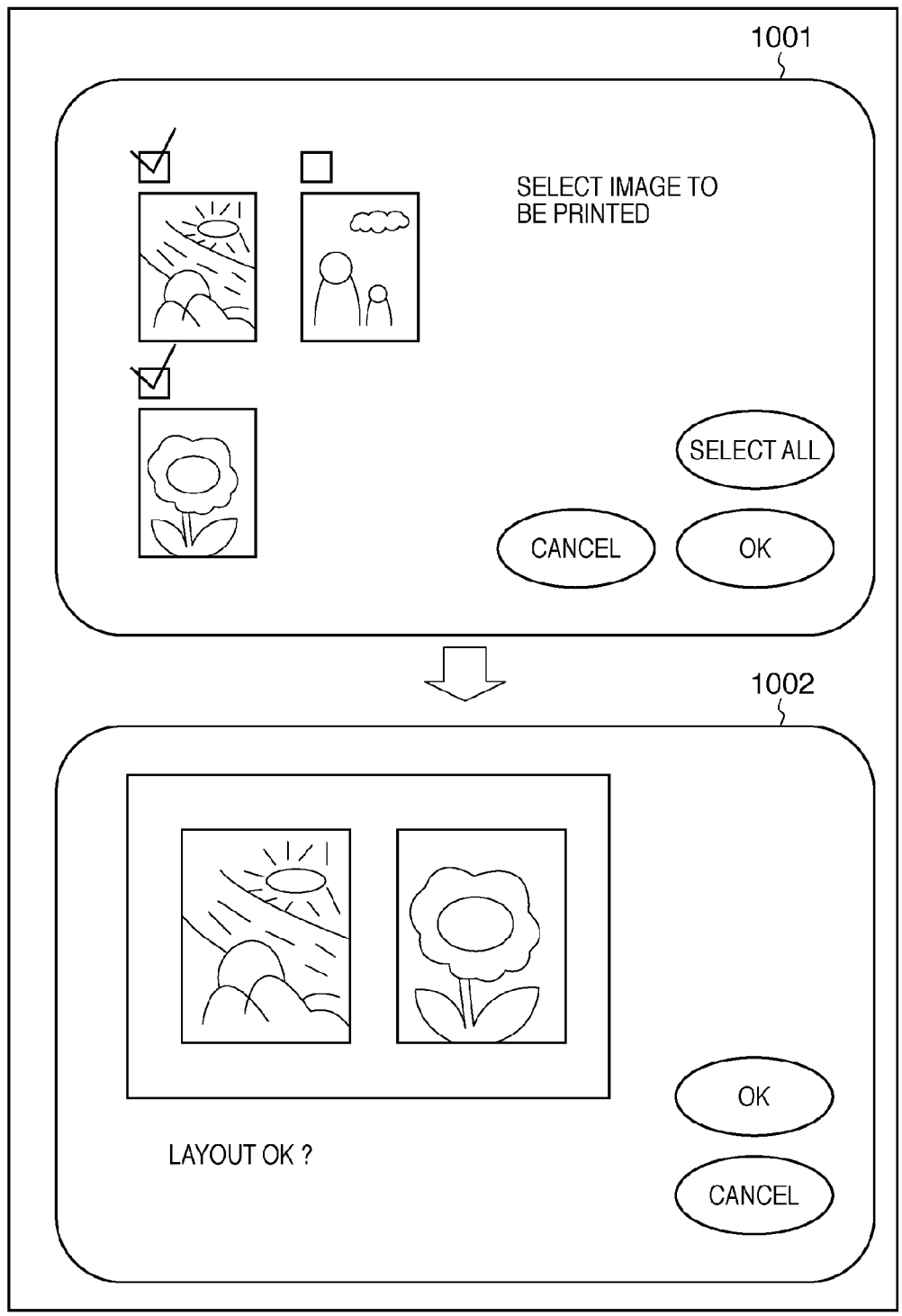
FIG. 10 is a view showing thumbnail image display in the media print function.

FIGS. 9A and 9B are flowcharts illustrating the procedure of normal print processing to be performed by the MFP 104 when executing the media print function. The processing shown in FIGS. 9A and 9B is executed by, for example, the CPU 309. When the media print function starts, an image file is read out from an external storage device such as an SD card or a USB memory connected to the external I/F 312. The image decompression unit 402 of the image processing unit 310 decompresses the readout image file, and a scaling processing module included in the other image processing unit 409 scales the image data to generate a thumbnail image. The MFP 104 displays the thumbnail images on the UI screen like a screen 1001 shown in FIG. 10 (S901). The MFP 104 accepts user's selection of print target images via the UI operation unit 228 on which the thumbnail images are displayed (S902). Next, the MFP 104 accepts user's selection of print page layout and a transparent toner mode (S903). The MFP 104 causes the scaling processing unit and a layout processing unit included in the other image processing unit 409 to generate an output image based on the images and layout information selected in steps S902 and S903, and displays a preview on the UI screen like a screen 1002 (S904).

When the user presses the OK button in the preview display on the screen 1002, the MFP 104 accepts permission of layout OK. Only the difference from the print function described with reference to FIGS. 7A and 7B will be described below up to print processing (S912).

When executing the print function, the user selects a transparent toner region in transparent toner region setting (S907) based on object information acquired by the PDL processing unit 305. On the other hand, in the media print function, the user selects a transparent toner region in transparent toner region setting (S907) based on layout information generated in step S903. More specifically, the outer frame of each image laid out as a print image is set as a transparent toner region, as in image data 1101 shown in FIG. 11 (S9071). Preview display in transparent toner region setting (S907) is done in the transparent toner use mode. Hence, each image laid out as in the image data 1101 is set upon initialization to apply the transparent toner. As described above, even when executing the media print function, the user can not only easily change the transparent toner region on the UI screen but also omit unnecessary user operations on the UI operation unit 228 when, for example, the transparent toner mode is not selected.

Processing of allowing the user to efficiently set whether to apply the transparent toner to each region of an image when executing the copy/print/media print function has been described above. More specifically, transparent toner region image data is generated in accordance with mode setting concerning the transparent toner and composited with input image data to display the image represented by the image data as preview image data. As a result, the user can set on the preview whether to use the transparent toner to obtain a gloss.

However, a transparent toner region image including many small display regions as on a screen 1201 shown in FIG. 12 may conversely require the user to perform a cumbersome operation. As a possible situation especially in the copy function, for example, when a region like a region 1202 to which the user do not want apply the transparent toner at all is extracted, and setting to automatically apply the transparent toner is selected, the user needs to cancel it. However, the UI screen of the MFP 104 is often relatively small, and it is difficult to select a region like the region 1202 on the UI operation unit 228. In addition, if there are a lot of such small regions, as on the screen 1201, the number of times of selection increases, resulting in a very cumbersome operation.

When executing the above-described copy function, initialization sets to apply the transparent toner to all photo regions acquired by the block selection processing (S4051) as transparent toner regions. However, out of the photo regions, regions smaller than a predetermined reference size often need not be given a gloss by the user. There can also be many determination errors where a region determined as a photo region by the block selection processing (S4051) is not a photo region but a noise image on the scanned document.

Doing initialization not to apply the transparent toner to regions smaller than a predetermined reference size can save the user canceling the transparent toner setting of the small regions. Alternatively, the user may be prohibited from selecting regions smaller than a predetermined reference size as regions to apply the transparent toner. Otherwise, the user may be allowed to select small regions at once by the drag operation on the UI operation unit 228 and cancel transparent toner setting of these regions at once.

Note that the "cancel all" button in FIG. 12 is used to set not to apply the transparent toner to any region. Such a button may be provided in FIG. 6 or 10.

An example has been described above in which the MFP 104 of the above-described embodiment accepts, via the UI screen 601, selection of a designation of whether or not to apply the transparent toner to a specified region. However, the present invention is not limited to this, and the MFP 104 may accept, via the UI screen 601, an instruction to enlarge or reduce a range based on a specified region. In this case, the user double-clicks and drags the edge of a region indicated by a broken line in FIG. 6 to enlarge or reduce the region.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
an inputting unit configured to input image data;
a recognizing unit configured to recognize a plurality of regions included in the image data input by the inputting unit;
a first setting unit configured to set to print, using a transparent toner, a region which is selected by a user from the plurality of regions recognized by the recognizing unit;
a second setting unit configured to set to print, using the transparent toner, the plurality of regions except for a remaining region which is different from the plurality of regions in the image data; and
a control unit configured (i) to control to print, using the transparent toner, the region which is selected by the user in a case where a region to be printed using the transparent toner is set by the first setting unit, and (ii) to control to print, using the transparent toner, the plurality of regions except for the remaining region which is different from the plurality of regions in the image data in a case where a region to be printed using the transparent toner is set by the second setting unit.

2. The apparatus according to claim 1, wherein the recognizing unit recognizes the plurality of regions by block selection.

3. The apparatus according to claim 1, further comprising:
a display unit configured to display the region which is set to be printed using the transparent toner so that the region is distinguished from another region which is not set to be printed using the transparent toner.

4. The apparatus according to claim 1, further comprising:
a determination unit configured to determine whether a region included in the image data input by the inputting unit is smaller than a reference region,
wherein, in a case where the determination unit determines that the region included in the image data input by the inputting unit is smaller than the reference region, the second setting unit sets not to print, using the transparent toner, the region which is smaller than the reference region.

5. The apparatus according to claim 1, wherein the plurality of regions include at least one of a text region, a photo region, or a line image region.

6. A method of controlling an image processing apparatus, which is executed in the image processing apparatus for processing image data for printing, the method comprising:
inputting image data;
recognizing a plurality of regions in the image data;
setting to print, using a transparent toner, a region which is selected by a user from the plurality of regions in the image data;
setting to print, using the transparent toner, the plurality of regions except for a remaining region which is different from the plurality of regions in the image data; and
controlling (i) to print, using the transparent toner, the region which is selected by the user in a case where a region to be printed using the transparent toner is set by setting to print the region, and (ii) to print, using the transparent toner, the plurality of regions except for the remaining region which is different from the plurality of regions in the image data in a case where a region to be printed using the transparent toner is set by setting to print the plurality of regions.

7. A non-transitory computer-readable storage medium storing a program which causes a computer to function to:
input image data;
recognize a plurality of regions in the image data;
set to print, using a transparent toner, a region which is selected by a user from the plurality of regions in the image data;
set to print, using the transparent toner, the plurality of regions except for a remaining region which is different from the plurality of regions in the image data; and
control to print, using the transparent toner, the region which is selected by the user in a case where a region to be printed using the transparent toner is set by setting to print the region, and (ii) to control to print, using the transparent toner, the plurality of regions except for the remaining region which is different from the plurality of regions in the image data in a case where a region to be printed using the transparent toner is set by setting to print the plurality of regions.

* * * * *